Oct. 12, 1937.  J. DELUCHI ET AL  2,095,409

MECHANICAL WINCH PARTICULARLY FOR DRAGGING FISHING NETS FROM THE WATER

Filed Jan. 8, 1936

INVENTOR:
JEAN DELUCHI
SAUVEUR CULLARÉ

By, Chatwin & Company. Attys.

Patented Oct. 12, 1937

2,095,409

UNITED STATES PATENT OFFICE 2,095,409

MECHANICAL WINCH PARTICULARLY FOR DRAGGING FISHING NETS FROM THE WATER

Jean Deluchi and Sauveur Cullaré, Marseille, France

Application January 8, 1936, Serial No. 58,166
In France September 28, 1935

1 Claim. (Cl. 254—137)

The invention relates to a mechanical winch particularly for dragging fishing nets from the water, the present improvements relating to modifications in carrying out the invention described in the co-pending application No. 44,024 dated October 8th, 1935 by the same applicants, the underlying principle remaining unaltered.

Figure 1:
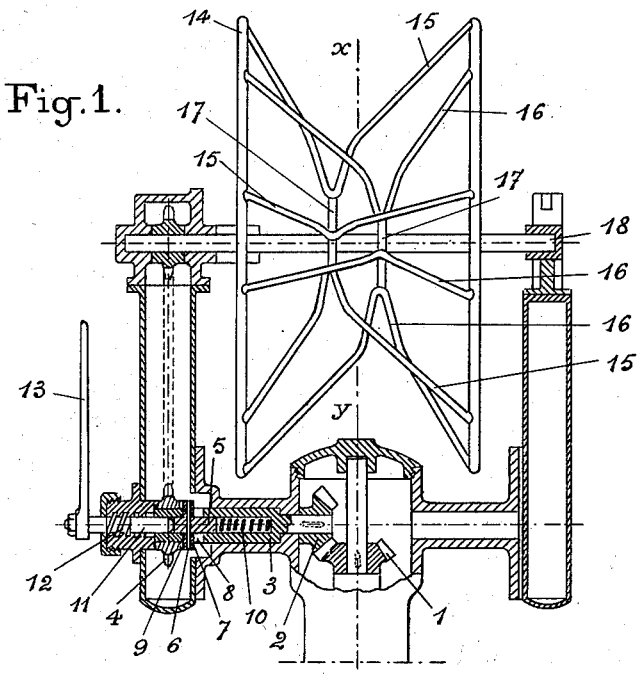
Figure 2:
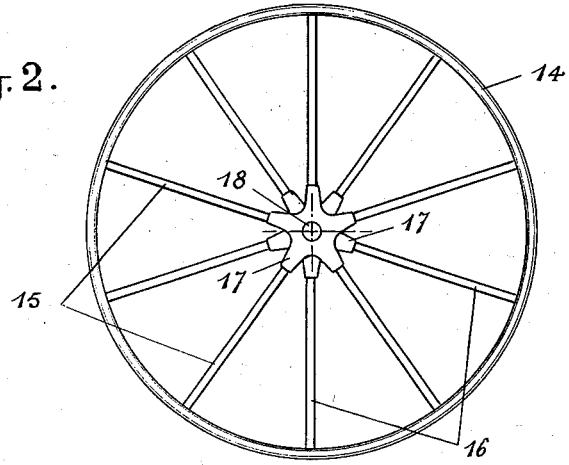

The invention is shown in the accompanying drawing by way of example wherein:

Figure 1 shows a section through the turret of a clutch mechanism and a driving pulley of a modification of the previous invention; Fig. 2 is a view of the driving pulley projected on a plane at 90 degrees to that in Fig. 1.

The pinion wheel 1 transmits the movement from the motor to the horizontal pinion wheel 2 keyed on a shaft 3 on the end of which rotates loosely a pinion wheel 4 or chain wheel which drives the shaft of the driving pulley.

The shaft 3 is perforated along its axis and receives internally a sliding die 5 through which passes a pin 6 carrying at each end rollers 7 which are sufficiently large to slide in mortices 8 provided in the shaft 3 and in notches 9 provided on the hub of the pinion wheel 4. The sliding die 5 is constantly thrust towards the left in the drawing by a spring 10 under compression in such a manner that the shaft 3 and the pinion wheel 4 shall be constantly integralized through the intervention of the rollers 7 which form keys or wedges.

An axial shaft 11 having a rapid screw thread 12 actuated by a lever 13 allows of pushing the die 5 to the right which provides at will the release or de-clutching of the pinion wheel 4.

The driving pulley is constructed of a series of members in different radial planes whose V-shaped portions constitute a peripheral series of V-shaped portions thereby constituting a drum or reel in which the V-shaped portions lie in a peripheral, sinusoidal path, as in the original application referred to but in this construction it is formed only by sections passing through the symmetrical axis of the bosses, the remaining parts being left empty.

The practical solution is carried out by means of two lateral rings 14 between which are situated in diametral planes, sections of short round pieces such as 15 and 16 having the same curved path but intercalated in such a manner that their asymmetrical form disposed alternately and symmetrically in relation to the plane x—y produces the formation desired, but having openings instead of being solid. The lower points of the fractions of groove thus obtained are secured to reduce cheeks or arms 17 which serve as hub for the mounting of the pulley on the shaft 18.

This modification in construction can be used in many cases without diminishing the value of the originally described construction.

We claim:—

A winch particularly for hauling fishing nets from the water comprising, in combination, two hollow vertical standards, spaced apart, bearings at the upper ends of said standards, an upper shaft rotatably mounted in said bearings, spaced rings mounted on said shaft, a plurality of arms connected at oppositely disposed spaced points on the peripheries of said rings, said arms having V-shaped portions, the meeting points of the V's being inwardly directed and in different vertical planes constituting a skeleton drum with a V-shaped peripheral sinusoidal path, a chain wheel fixed on said upper shaft, a fixed hollow transverse member located below said upper shaft, a hollow rotatable shaft mounted in said fixed member, a slidable die member in said hollow rotatable shaft, a lower chain wheel loosely mounted on said hollow rotatable shaft, rollers carried by the die member engaging said lower chain wheel, a spring holding said rollers engaging said lower chain wheel, means for moving the die member to disengage said rollers, and means rotatably connecting said chain wheels, the lower rotatable shaft being driven.

JEAN DELUCHI.
SAUVEUR CULLARÉ.